United States Patent
Litwin et al.

(10) Patent No.: US 6,943,867 B2
(45) Date of Patent: *Sep. 13, 2005

(54) METHOD AND SYSTEM FOR SHIPPING OF PHOTOFINISHING ORDERS

(75) Inventors: Joshua J. Litwin, San Francisco, CA (US); David W. Hill, Walnut Creek, CA (US); David Lu, Emeryville, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/853,809

(22) Filed: May 26, 2004

(65) Prior Publication Data

US 2004/0211157 A1 Oct. 28, 2004

Related U.S. Application Data

(62) Division of application No. 10/393,234, filed on Mar. 20, 2003, now Pat. No. 6,812,998.

(51) Int. Cl.[7] .................. G03B 27/52; G03B 27/32; G03B 29/00; G06F 17/60; G01G 19/413
(52) U.S. Cl. .................. 355/40; 355/18; 355/77; 396/429; 705/26; 705/407
(58) Field of Search .................. 355/18, 40, 77; 396/429; 705/26, 27, 401, 404, 407, 410, 414; 53/154

(56) References Cited

U.S. PATENT DOCUMENTS

| | | | | |
|---|---|---|---|---|
| 4,639,873 A | * | 1/1987 | Baggarly et al. | 705/406 |
| 4,800,505 A | * | 1/1989 | Axelrod et al. | 700/221 |
| 6,017,157 A | * | 1/2000 | Garfinkle et al. | 396/639 |
| 6,324,521 B1 | * | 11/2001 | Shiota et al. | 705/27 |
| 6,657,702 B1 | * | 12/2003 | Chui et al. | 355/40 |
| 6,812,998 B2 | * | 11/2004 | Litwin et al. | 355/49 |
| 2001/0041072 A1 | * | 11/2001 | Takano | 396/429 |
| 2002/0067500 A1 | * | 6/2002 | Yokomizo et al. | 358/1.15 |
| 2002/0083020 A1 | * | 6/2002 | Leon | 705/401 |
| 2003/0132298 A1 | * | 7/2003 | Swartz et al. | 235/472.02 |
| 2003/0182210 A1 | * | 9/2003 | Weitzman et al. | 705/27 |

OTHER PUBLICATIONS

Specification sheet for software application "Postal Package Partner" sold by WindowBook Inc. that supports shipping and mailing of products dated Jun. 30, 2002.

Description of "Postal Manifesting Module" software product application, for Manifest Mailing System sold by Malvern, dated Jul. 18, 2002.

* cited by examiner

*Primary Examiner*—Alan Mathews
(74) *Attorney, Agent, or Firm*—Frank Pincelli

(57) ABSTRACT

A system and method for automatically determining the shipping weight and cost of a plurality of photofinishing items from a service provider without physically weighing the photofinishing order. A computer system receives photofinishing orders from the customers and associates an order ID with respect to each of the photofinishing orders. The orders are filled and sent to a packing station for assembling the photofinishing order. Each order is placed in a shipping package having the order ID thereon in a machine readable format. A reading device reads order ID and obtains information for determining the associated estimated weight for each package. A printer produces a manifest to be used in shipping the plurality of photofinishing orders wherein the manifest provides the estimated weight and cost for each of the orders that is given to the shipping agent for shipment to customers.

41 Claims, 3 Drawing Sheets

OFOTO
5900 HALLIS ST.
SUITE 5
EMERYVILLE, CA U.S.A.

OFOTO
SHIPPING MANIFEST

DATE: _____   PERMIT # XXXX

| ORDER # | SHIPPING DESTINATION | EST. WEIGHT OZ. | POSTAGE $ | CUM. POST. | CUM. PIECE |
|---|---|---|---|---|---|
| 12345G | 145 RED CEDAR, NO WHERE USA | 5 | .55 | .55 | 1 |
| 12346G | 101 ELM, ANYWHERE USA | 10 | .75 | 1.30 | 2 |
| 12347G | 10 STATE ST. | 15 | .95 | 2.25 | 3 |
| 12348G | ......... | 24 | 1.35 | 3.60 | 4 |
| 12349G | ......... | 10 | .75 | 4.35 | 5 |
| 12350G | ......... | 10 | .75 | 5.10 | 6 |
| 12351G | ......... | 5 | .75 | 5.85 | 7 |
| 12352G | ......... | 8 | .65 | 6.50 | 8 |
| 12353G | ......... | 24 | 1.35 | 7.85 | 9 |
| 12354G | ......... | 5 | .55 | 8.40 | 10 |
| 12355G | ......... | 24 | 1.35 | 9.75 | 11 |
| 12356G | ......... | 10 | .75 | 10.50 | 12 |
| 12357G | ......... | 10 | .75 | 11.25 | 13 |

METHOD AND SYSTEM FOR SHIPPING OF PHOTOFINISHING ORDERS

CROSS REFERENCE TO RELATED APPLICATIONS

This is a divisional of U.S. patent application Ser. No. 10/393,234 filed Mar. 20, 2003, now U.S. Pat. No. 6,812,998.

FIELD OF THE INVENTION

The present invention relates to shipping of photofinishing orders and more particularly to a method and system for efficiently sending a plurality of photofinishing orders to a plurality of different customers.

BACKGROUND OF THE INVENTION

In today's photofinishing, digital image capture has played an increasing roll in providing greater flexibility to the user forwarding various image products. It has become quite popular to upload digital images to a photofinishing site such as Ofoto website (ofoto.com) wherein a user can store images and order image products such as photographic prints. Not only can the user order any desired number of prints, but the user can also order a wide variety of size prints and additional products. This provides the customer with a large latitude in ordering many different products. This however creates a problem for the service provider in determining the cost for shipping all of the orders back to many respective customers that have placed orders. This entails the need to weigh each and every shipping parcel in order to determine the appropriate shipping costs for each of the packages for each customer order. This requires a substantial amount of handling by the photofinisher which increases the cost that must be passed on to the consumer. Thus, there is a need to provide an efficient manner for determining the shipping cost for a wide variety of orders, each potentially having different shipping costs.

SUMMARY OF THE INVENTION

In accordance with one aspect of the present invention, there is provided a method for automatically determining the shipping weight of an order for products to a customer from a service provider without physically weighing said order, comprising the steps of:

said service provider receiving an order from a customer for at least one product;

associating a order ID with respect to said order producing said at least one product for said order;

assembling said order and placing said order within a package, said package having said ID thereon in a machine readable format; and reading said machine readable ID for obtaining an associated estimated weight and providing an associated estimated weight on a manifest to be used in shipping said order along with a plurality of other orders.

In accordance with another aspect of the present invention there is provided a system for automatically determining the shipping weight of an order to a customer from a service provider without physically weighing said order comprising:

a computer system at said service provider for receiving an order from said customer for at least one product, said computer system associating an order ID with respect to said order;

means for obtaining said at least one product for said order;

a packing station for assembling said order and placing said order within a package, said package having said ID thereon in a machine readable format;

a reading device for reading said machine readable ID for obtaining information for determining an associated estimated weight for a plurality of said orders in a shipment; and an output device for providing a manifest to be used in shipping said plurality of orders along with a plurality of other orders, said manifest providing said associated estimated weight of each of said orders.

BRIEF DESCRIPTION OF THE DRAWINGS

In the detailed description of the preferred embodiments of the invention presented below, reference is made to the accompanying drawings in which:

FIG. 5 is a plan view of a manifest used in association with shipping of a plurality of photofinishing orders through a single shipment.

DETAILED DESCRIPTION OF THE INVENTION

Figure 1:
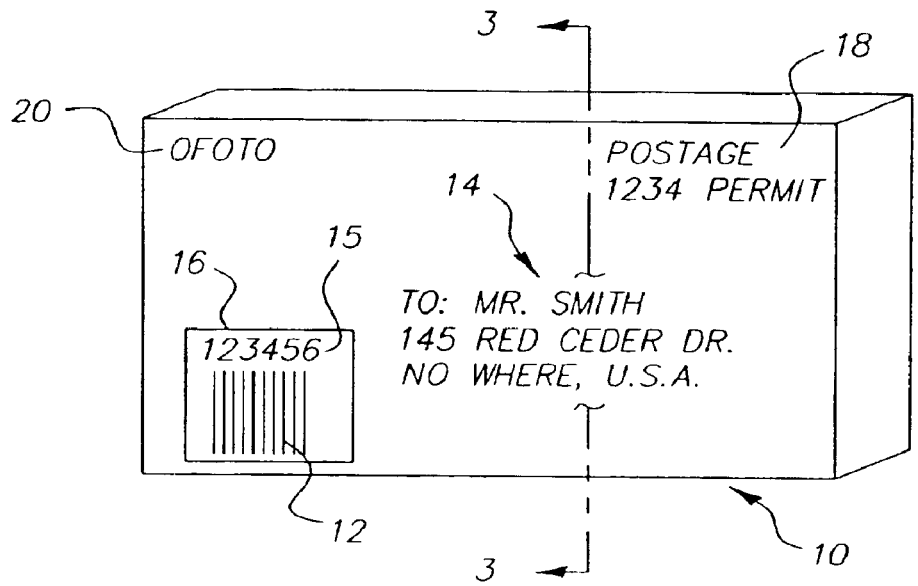
FIG. 1 illustrates a package for shipping of image products.
Figure 2:
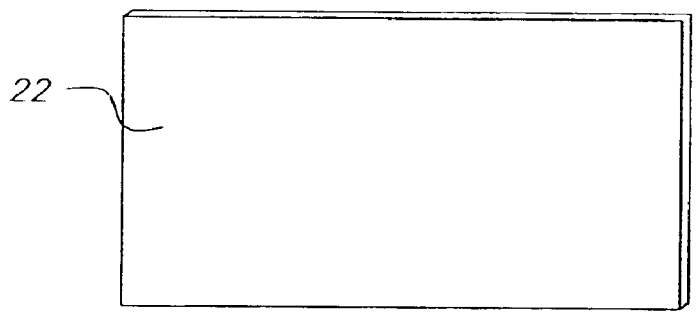
FIG. 2 illustrates an image product in the form of a photographic print that may be placed in the package illustrated in FIG. 1.
Figure 3:
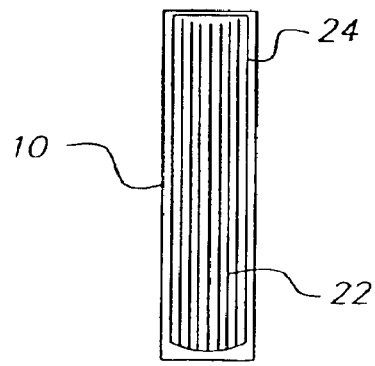
FIG. 3 is a cross-sectional view of the package of FIG. 1 illustrating a wallet holding a plurality of prints illustrated in FIG. 2.

Referring to FIG. 1–3, there is illustrated a package 10 for shipping of a photofinishing order to the customer that has been prepared by an image provider. In the particular embodiment illustrated, the customer shipping address 14 is provided on the package. The package 10 also includes a machine readable unique order ID 12 that is associated with the customer. In the particular embodiment illustrated, the ID 12 is in the form of a machine readable bar code. However, any appropriate machine readable code may be used. A human readable form 15 of the ID 12 is provided as a backup in case the machine readable order ID becomes unreadable. In the particular embodiment illustrated the order ID has been printed on a label 16 that has been secured to package 10. However, it is to be understood that the order ID may be printed directly on the package 10 if so desired. Placing the ID on a label makes the assembly process easy and avoids the need of providing a specifically designated printer. The package 10 may have other information thereon, for example, appropriate postage 18 and shipper information 20. In the particular embodiment illustrated, postage 18 comprises an official postal permit number under which large groups of package can be mailed through the US Postal Service. In the particular embodiment illustrated, the permit number is issued by the U.S. Postal Service, is provided on package 10, however, any other permit or authorization indicia may be provided as required by the shipping agent.

A customer photofinishing order may comprise a single or a multitude of prints and/or a variety of different type items. For example, a photofinishing order may comprise any number of photographic prints anywhere from one to hundreds. Additionally, the photographic prints may come in a variety of predetermined sizes. For example, but not limited to, 3×5; 4×6; 5×7; 8×10; 11×13; etc. In the particular embodiment illustrated in FIG. 3, seven (7) photographic prints 22 have been placed in a single wallet 24. In addition, various other image products may be shipped to the customer for example, photographic frames, calendars, posters, etc. While many different products may be shipped to the customer, the known weight of all of these individual products i.e. prints, posters, frames, etc., have predetermined average weights that can be determined and stored in a computer's memory. The individual weights of each of these individual items, including the associated packing and shipping materials, are all fairly constant and vary only slightly. Thus, when a customer places an order with the photoservice provider, at that point in time, the estimated weight of the order to be shipped can be calculated in accordance with predetermined criteria. For example, if 24 photographic prints, each having a size of 4×6 inches are ordered, the average weight of each individual print is known, and the number of wallets necessary for packing of the prints therein are known in accordance with the predetermined criteria, the weight of each wallet and the size and weight of the package needed for shipping of the items to be shipped to the customer is also set forth by a predetermined criteria. The particular criteria for shipping of any order will of course be dependent upon the goods ordered, the package needed to ship the order, and associated materials needed for shipping of the complete order. Knowing this information, an estimated shipping weight of the packaged order, can be calculated which in turn allows for automatic calculation of the shipping cost for each order. As previously noted, the size of the products to be shipped is known. This includes knowing the three dimensional size of the goods to be shipped. Thus, it is also possible to take the three dimensional size and weight of the package (sometimes referred to as dimensional weight) in determining the shipping cost.

Figure 4:
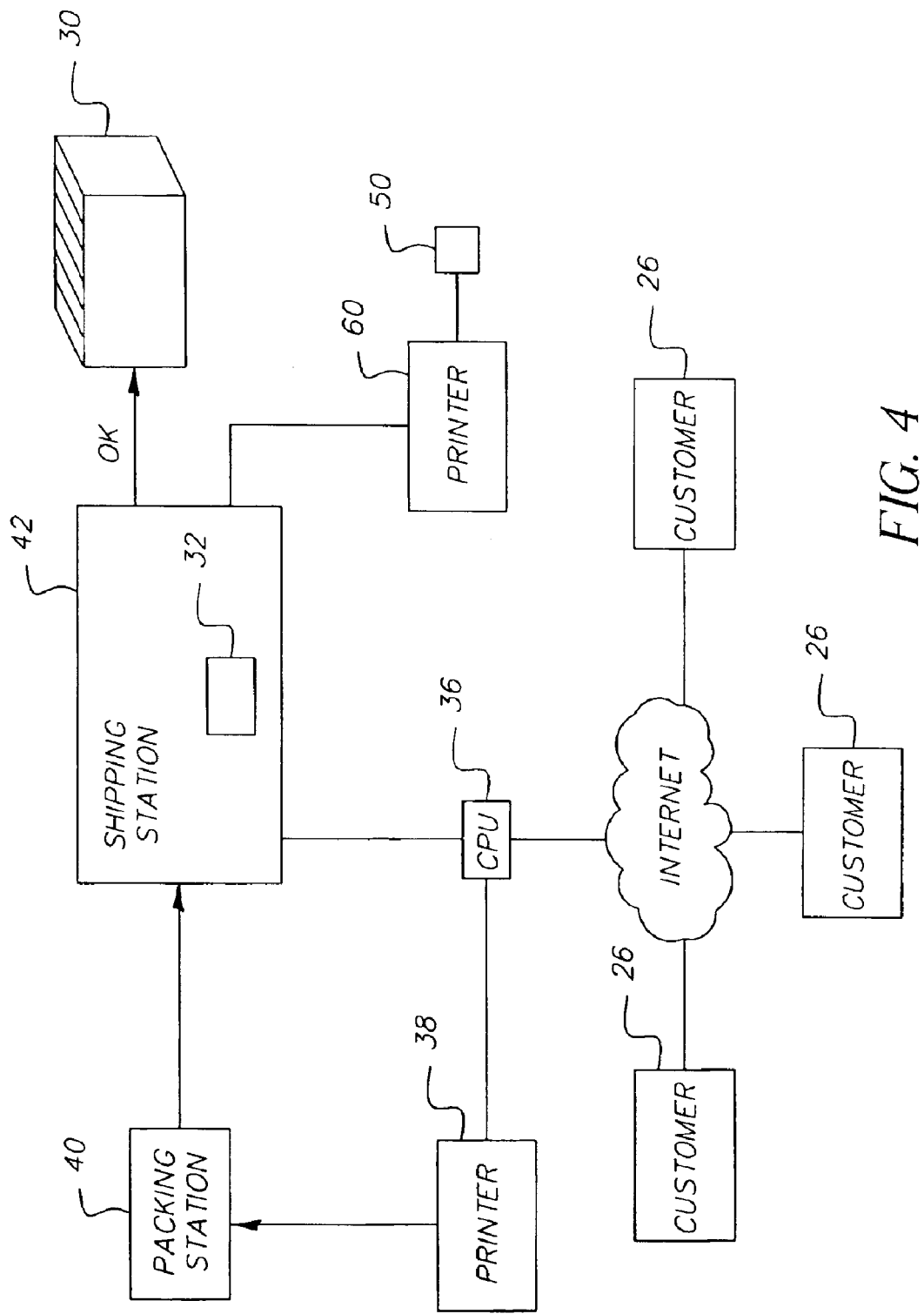
FIG. 4 is a schematic illustration of a process flow chart of a system for shipping a wide variety of photofinishing orders having different weights and/or sizes.

In order to better understand the process, a brief description will be provided. Referring to FIG. 4, there is illustrated a system for implementing the present invention. Initially, a customer 26, among a plurality of customers, will place an order with an image service provider, such as Ofoto website (ofoto.com). This may take a variety of forms, for example, over a communication network, such as the illustrated Internet 28, or by mail. It is to be understood that any appropriate communication network may be utilized for sending of the order to the service provider. In the particular embodiment illustrated, the customers 26 either uploads an image to computer system (CPU) 36 and/or accesses their account where images have been previously stored. In any event, a photofinishing order is created by the customer for providing of selected image products. This information is stored into CPU 36 for processing and tracking of the customer order. Each customer order is associated with a unique order ID 12 by CPU 36. Knowing the make-up of the customer order, an estimated shipping weight of the package containing the ordered goods is calculated and stored. The appropriate image products are produced for example, if prints have been ordered, the customer order will be forwarded to an appropriate printing device 38, such as a digital mini-lab, wherein the appropriate number of prints are produced and associated with the order ID. The completed image products ordered are then forwarded to a packing station 40 wherein the image products package 10 that comprise the order are assembled. Any other image products ordered are also sent to the packing station for assembly with the customer order. In the particular example illustrated, the ordered prints and wallet(s) or other materials to be provided, are assembled and placed in package 10.

Once the customer order has been assembled and properly placed in package 10, the filled package 10 is then sent on to a shipping station 42 for preparation for transferring to a shipping agent for delivery to the customer.

At the shipping station 42, there is provided a reader 32 for reading of the ID 12 on the each of the packages 10. The ID number will go to a computer system 36 which then obtains appropriate information from the storage memory and thereby associates a particular estimated weight that the package 10 should have. This information is sent on to a printer 60. At the shipping station 42, a plurality of packages 10 are placed together so as to create a shipment 30 which comprises a plurality of individual packages. In particular, this simply means that the individual packages 10 are grouped or bundled together in an appropriate format for handing over to the shipping agent. The CPU 36 knowing the appropriate number of packages that are provided in the shipment 30 will send this information to an output device 60 which produces a manifest 50 which provides certain information to the shipping agent. In the particular embodiment illustrated the output device comprises a printer that produces a hard copy manifest 50. However, the manifest to be provided to the shipper may be provided in any appropriate format. For example, the output device may produce the manifest in an electronic format such as a CD, computer disc, or computer file that can be e-mailed or provided to the shipper in any convenient manner or format.

Referring to FIG. 5 there is illustrated an enlarged view of a sample shipping manifest 50 for shipping a grouping of packages 10 to be shipped as a single shipment 30 to a shipping agent, such as the U.S. Postal Service. In the particular embodiment illustrated, manifest 50 comprises a predefined list of information for each individual package 10 with respect to the overall shipment 30. The manifest 50 lists an order number 52 in column 54 for each of the individual packages 10 in addition to the estimated weight in column 56 and shipping cost in column 58. Column 55 provides the shipping address of the recipient. Columns 61 and 62 illustrate the cumulative postage (shipping cost) for the individual packages and number of packages, respectively. The manifest 50 is submitted to the shipping agent along with the associated packages 10. When the shipping agent is the U.S. Postal Service, a certificate certifies that these items have been provided.

The manifest 50 can also be used as a means for checking the accuracy of the shipping order. For example, the shipping agent may periodically check the accuracy of the shipping manifest by pulling out individual packages and comparing the actual weights and calculated shipping cost with the values provided on the manifest 50.

In the particular embodiment illustrated, the estimated weight is calculated and stored when the order is initially received, however, this calculation can take place at any time and need not be stored. For example, the estimated weight can be calculated at the time the manifest 50 is to be produced. The calculation may be done by the computer system 36 or by an appropriate device at the shipping station 42 which obtains the appropriate order information and then calculates the estimated shipping weight.

In the particular embodiment illustrated, the customer order comprises of only one package 10. It is possible that a single customer order will result in the need for more than one package 10. In such a case, each package would receive its own individual customer order ID and each of the order IDs would be listed separately on the manifest 50 with its own shipping cost.

As can be clearly seen, the cost of an individual postage is required for each of the packages which is quickly and automatically determined in an accurate manner. This allows the ability to have a variety of different packages placed together in a single shipment, yet avoids the need for individual weighing and providing of individual postage on each of the many packages in each shipment.

It is to be understood that various modifications and changes may be made without departing from the present invention, the present invention being defined by the following claims.

PARTS LIST 10 package
12 machine readable unique order ID
14 customer shipping address
15 human readable code
16 label
18 postage
20 shipper information
22 photographic prints
24 wallet
26 customer
28 Internet
30 shipment
32 reader
36 computer system (CPU)
38 printing device
40 packing station
42 shipping station
50 manifest
52 order number
54 order number column
55 shipping address column
56 estimated weight column
58 shipping weight column
60 printer
61 cumulative column
62 number of packages column

What is claimed is:

1. A method for automatically determining the shipping weight of an order for products to a customer from a service provider without physically weighing said order, comprising the steps of:

said service provider receiving an order from a customer for at least one product;

associating a order ID with respect to said order producing said at least one product for said order;

assembling said order and placing said order within a package, said package having said ID thereon in a machine readable format; and reading said machine readable ID for obtaining an associated estimated weight and providing an associated estimated weight on a manifest to be used in shipping said order along with a plurality of other orders.

2. A method according to claim 1 wherein said at least one product comprises a plurality of substantially identical items.

3. A method according to claim 1 wherein said order includes associated packing material.

4. A method according to claim 1 wherein said order includes advertising material.

5. A method according to claim 2 wherein said order comprises at least one packing item that is to be used for holding a number of said plurality of substantially identical items.

6. A method according to claim 2 wherein said substantially identical items comprises at least two different sizes.

7. A method according to claim 1 wherein the estimated weight is used to provide the cost for shipping for each of said packages.

8. A method according to claim 1 wherein said at least one product comprises a plurality of items that need to be shipped to said customer in more than one package, wherein each of said packages has its own associated order ID with respect to said customer.

9. A method according to claim 1 wherein said order ID is printed on a label and placed on said package.

10. A method according to claim 1 wherein said associated estimated weight is determined by a computer system that received said order.

11. A method according to claim 10 wherein associated estimated weight system of the at least one product and package for containing said product is stored on said computer.

12. A method according to claim 11 wherein said associated estimated weight is determined at a shipping station.

13. A method according to claim 1 wherein said associated estimated weight is obtained by accessing a computer and using said ID to obtain said associated estimated weight.

14. A method according to claim 1 wherein said at least one product comprises a variety of different items.

15. A method according to claim 1 wherein a variety of different items is selected from the following:

frames;

posters;

calendars; and hard copy prints.

16. A method according to claim 1 wherein said order is received over the Internet.

17. A method according to claim 1 wherein said manifest comprises a list of items comprising the shipment, including said ID, the estimated weight and shipping cost for each package in said shipment.

18. A method according to claim 17 wherein said manifest also includes the cumulative shipping cost and number of packages in said shipment.

19. A method according to claim 17 wherein said manifest also includes an official postal permit number and date of shipment.

20. A method according to claim 1 wherein said manifest is used by the shipping agent for checking of the weights to determine if the shipped orders are in compliance with the manifest.

21. A method according to claim 1 wherein said estimated weight includes the dimensional weight of said package.

22. A system for automatically determining the shipping weight of an order to a customer from a service provider without physically weighing said order comprising:

a computer system at said service provider for receiving an order from said customer for at least one product, said computer system associating an order ID with respect to said order;

means for obtaining said at least one product for said order;

a packing station for assembling said order and placing said order within a package, said package having said ID thereon in a machine readable format;

a reading device for reading said machine readable ID for obtaining information for determining an associated estimated weight for a plurality of said orders in a shipment; and an output device for providing a manifest to be used in shipping said plurality of orders along with a plurality of other orders, said manifest providing said associated estimated weight of each of said orders.

23. A system according to claim 22 wherein said products comprises a plurality substantially identical items.

24. A system according to claim 22 wherein said order includes associated packing material.

25. A system according to claim 22 wherein said order includes advertising material.

26. A system according to claim 23 wherein said order comprises at least one holder that is to be provided in association with a number of said substantially identical items.

27. A system according to claim 22 wherein said at least one product comprises a plurality of items that need to be shipped to said customer in more than one package, wherein each of said packages has its own associated order ID with respect to said customer.

28. A system according to claim 22 wherein said order ID is printed on a label and placed on said package.

29. A system according to claim 22 wherein said information comprises an estimated weight determined by a computer system that received said order.

30. A system according to claim 29 wherein said information is stored in said computer system with respect to known weights of the at least one product and package for containing said product.

31. A system according to claim 29 wherein said estimated weight is determined at a shipping station.

32. A system according to claim 22 wherein said information obtained from reading said order ID comprises the associated estimated weight stored on said computer system.

33. A system according to claim 22 wherein said information obtained from reading said order ID comprises the weights of the package and said at least one product comprising said order that can be used in calculating said estimated weight.

34. A system according to claim 22 wherein said order is received over the Internet.

35. A system according to claim 22 wherein said manifest comprises a list of items comprising the shipment, including said ID, the estimated weight and shipping cost for each package in said shipment.

36. A system according to claim 22 wherein said manifest also includes the cumulative shipping cost and number of packages in said shipment.

37. A system according to claim 22 wherein said manifest also includes an official postal permit number and date of shipment.

38. A system according to claim 22 wherein said manifest is used by the shipping agent for checking of the actual weights of said package to determine if the shipped orders are in compliance with the manifest.

39. A system according to claim 22 wherein said output device comprises a printer for printing a hard copy manifest.

40. A system according to claim 22 wherein said output device provides said manifest in an electronic form.

41. A system according to claim 40 wherein said electronic form comprises one of the following:

a CD;

a computer disc;

an electronic e-mail;

computer file.

* * * * *